(12) United States Patent
Charton (10) Patent No.: US 10,578,860 B2
(45) Date of Patent: Mar. 3, 2020

(54) DEFORMABLE MIRROR WITH VARIABLE CURVATURE AND METHOD FOR MANUFACTURING SUCH A MIRROR

(71) Applicant: ALPAO, Montbonnot Saint Martin (FR)

(72) Inventor: Julien Gérard Ernest Charton, Brignoud (FR)

(73) Assignee: ALPAO, Montbonnot Saint Martin (FR)

( * ) Notice: Subject to any disclaimer, the term of this patent is extended or adjusted under 35 U.S.C. 154(b) by 0 days.

(21) Appl. No.: 15/958,326

(22) Filed: Apr. 20, 2018

(65) Prior Publication Data
US 2018/0307037 A1    Oct. 25, 2018

(30) Foreign Application Priority Data

Apr. 20, 2017 (FR) ...................... 17 53440

(51) Int. Cl.
*G02B 26/08* (2006.01)
*G02B 7/18* (2006.01)
(Continued)

(52) U.S. Cl.
CPC .......... *G02B 26/0825* (2013.01); *F24S 23/70* (2018.05); *F24S 23/71* (2018.05);
(Continued)

(58) Field of Classification Search
CPC .. G02B 26/08; G02B 26/0825; G02B 5/0816; G02B 5/09; G02B 2006/12104;
(Continued)

(56) References Cited

U.S. PATENT DOCUMENTS 3,699,576 A * 10/1972 Hoyer ................... H01Q 15/16
                                                                 342/10
4,033,676 A    7/1977 Brantley, Jr. et al.
(Continued)

FOREIGN PATENT DOCUMENTS

DE        2506905 A1    8/1976

OTHER PUBLICATIONS

French Search Report dated Feb. 15, 2018 corresponding to application No. FR1753440.

*Primary Examiner* — Cara E Rakowski
*Assistant Examiner* — Magda Cruz
(74) *Attorney, Agent, or Firm* — Nath, Goldberg & Meyer; Jerald L. Meyer (57) ABSTRACT

A deformable mirror with variable curvature including: a plate having a reflective face and opposite hidden face and whose shape has a center (C) and radiuses (r), and at least one actuator intended to exert a force on the hidden face in order to deform the plate. The plate comprises a plurality of primary and secondary portions. The secondary portions being interposed between the primary portions, each of the primary portions extending locally substantially along and on either side of a respective radius (r') among said radiuses (r), and having a stiffness different from the adjacent secondary portions. The deformable mirror is intended to the introduction or the correction of an optical aberration in a light beam.

31 Claims, 3 Drawing Sheets

(51) Int. Cl.
| | |
|---|---|
| *G02B 5/08* | (2006.01) |
| *G02B 5/10* | (2006.01) |
| *G02B 7/185* | (2006.01) |
| *G02B 7/198* | (2006.01) |
| *G02B 26/00* | (2006.01) |
| *G02B 5/09* | (2006.01) |
| *G02B 19/00* | (2006.01) |
| *F24S 23/70* | (2018.01) |
| *G02B 7/182* | (2006.01) |
| *F24S 23/71* | (2018.01) |
| *F24S 23/74* | (2018.01) |
| *F24S 23/77* | (2018.01) |
| *F24S 23/72* | (2018.01) |
| *F24S 23/79* | (2018.01) |
| *G02B 26/06* | (2006.01) |
| *G02B 6/12* | (2006.01) |

(52) U.S. Cl.
CPC ............. *F24S 23/715* (2018.05); *F24S 23/72* (2018.05); *F24S 23/74* (2018.05); *F24S 23/745* (2018.05); *F24S 23/77* (2018.05); *F24S 23/79* (2018.05); *F24S 23/80* (2018.05); *F24S 23/81* (2018.05); *F24S 23/82* (2018.05); *G02B 5/0816* (2013.01); *G02B 5/09* (2013.01); *G02B 5/10* (2013.01); *G02B 7/18* (2013.01); *G02B 7/182* (2013.01); *G02B 7/185* (2013.01); *G02B 7/1827* (2013.01); *G02B 7/198* (2013.01); *G02B 19/0019* (2013.01); *G02B 19/0028* (2013.01); *G02B 26/00* (2013.01); *G02B 26/06* (2013.01); *G02B 26/08* (2013.01); *G02B 26/0841* (2013.01); *G02B 2006/12104* (2013.01)

(58) Field of Classification Search
CPC . G02B 7/18; G02B 7/185; G02B 5/10; G02B 7/198; G02B 26/00; G02B 26/0841; G02B 7/182; G02B 7/1827; G02B 19/0019; G02B 19/0028; G02B 26/06; F24S 23/715; F24S 23/70; F24S 23/71; F24S 23/72; F24S 23/74; F24S 23/745; F24S 23/77; F24S 23/79; F24S 23/80; F24S 23/81; F24S 23/82
See application file for complete search history.

(56) References Cited

U.S. PATENT DOCUMENTS

| | | | | |
|---|---|---|---|---|
| 6,384,800 | B1 * | 5/2002 | Bassily | H01Q 1/288 343/882 |
| 2012/0314315 | A1 * | 12/2012 | Yoshimura | G02B 26/0825 359/853 |
| 2014/0085740 | A1 * | 3/2014 | Rooms | G02B 26/06 359/846 |
| 2019/0310459 | A1 * | 10/2019 | Alzaydi | G02B 5/10 |

* cited by examiner

DEFORMABLE MIRROR WITH VARIABLE CURVATURE AND METHOD FOR MANUFACTURING SUCH A MIRROR

The present invention concerns the general field of deformable mirrors used in adaptive optical systems, for various applications such as astronomy, medicine, in particular ophthalmology, the use of lasers, microscopy, microelectronics, etc.

More particularly, the present invention relates to a deformable mirror including on the one hand a plate having a reflective face and an opposite hidden face and whose shape has a center and radiuses, and on the other hand at least one actuator intended to exert a force on said hidden face in order to deform said plate.

The present invention also concerns a method for manufacturing such a mirror.

It is known to use deformable mirrors in order to simulate or correct optical aberrations, that is to say irregularities of the wavefront of a light beam producing for example an astigmatism, for example by generating concavities or convexities at the surface of such a mirror, in particular circular.

Such mirrors comprise a flexible plate including a reflective face and an opposite hidden face, said hidden face being linked to several actuators intended to locally maneuver said plate back and forth, and therefore modify the optical path traveled by the different rays constituting the light beam being reflected on the reflective face of said plate. Thus, it is possible to compose the phase shifts at the origin of the deformation of the wavefront.

However, such known mirrors have the drawback of requiring a large number of actuators, thereby making such mirrors complex to install, and that even for imparting a simple deformation of said mirrors such as the generation of a concave or convex curvature, and generating a considerable manufacturing cost as well as some fragility, the malfunction of one single actuator may result in a deformation defect of said deformable plate. In addition, the linkages of said numerous actuators with said hidden face are relatively complex to make and have a limited service life, thereby further increasing the costs, and causing considerable downtime periods to repair these linkages. Said downtime periods are further worsened by the time spent in changing one of the multiple actuators that has broken down.

It is also known to use optical systems comprising a circular deformable mirror and one single actuator which is of the suction/compression type, involving a fluid in contact with a hidden face of the mirror, or mechanical, involving a screw in contact with said hidden face. Such a mirror comprises a circular deformable plate having a particular thickness profile, said thickness decreasing from the center of said mirror up to its periphery in a continuous and axially symmetrical manner, according to one or several mathematical formulas comprising factors such as: the type of actuator and of the mirror support, the radius of said circular mirror, etc.

However, such a configuration is difficult and complex to implement, this type of system remaining difficult to make in an accurate manner, in particular said particular thickness profile of said plate. Indeed, said mathematical formula on which the latter is based is extremely complex and includes numerous factors, including the type of actuator and the general support configuration, as well as the radius of said circular mirror, which increases the risk of error during the manufacture of such a mirror. It is difficult and expensive to make a mirror having this particular plate thickness profile according to such specific mathematical formula, by reducing the thickness of said plate in an accurate manner according to the radius of said circular mirror. Finally, such optical systems are expensive to make, on the one hand because of the method for making said thickness profile, and on the other hand because of the scrap rate of mirrors in which the thickness profile does not perfectly corresponds to the mathematical formula, the applications of the deformable mirrors generally requiring a high accuracy of manufacturing.

It is also known to use optical systems comprising a circular deformable plate and one single mechanical actuator intended to pull or push said plate at its center in order to deform it, said plate having a thickness which decreases from its center up to its circular edge in an axially symmetrical staggered and continuous manner, like stairs steps.

However, such a configuration is difficult and complex to implement for the same reasons as previously stated. Indeed, said steps, carved in the thickness of said plate, are difficult and expensive to make, increasing the scrap rate of mirrors in which one of the steps has not been made accurately, for example a too wide or a too thick step.

Consequently, the objects assigned to the invention aim at overcoming the different drawbacks enumerated in the foregoing and at providing a new deformable mirror which is reliable, compact, and whose manufacture is inexpensive and barely complex.

Another object of the invention aims at providing a new deformable mirror with a simple and robust structure.

Another object of the invention aims at providing a new deformable mirror whose setting within an optical system is easy, rapid and cheap.

Another object of the invention aims at providing a new deformable mirror capable of focusing or defocusing an optical beam accurately and rapidly.

Another object of the invention aims at providing a new deformable mirror easily adaptable according to the introduction or the correction of the optical aberration that is desired to be obtained.

Another object of the invention aims at providing a new deformable mirror particularly adapted to generate a curvature such as a concavity or a convexity.

Finally, an object of the invention aims at providing a new deformable mirror which requires only a limited number of actuator(s) to be implemented within an optical system.

The objects assigned to the invention are achieved by means of a deformable mirror including on the one hand a plate having a reflective face and an opposite hidden face and whose shape has a center and radiuses, and on the other hand at least one actuator intended to exert a force on said hidden face in order to deform said plate, characterized in that said plate comprises a plurality of primary and secondary portions, said secondary portions being interposed between said primary portions, each of said primary portions extending locally substantially along and on either side of a respective radius among said radiuses and having a stiffness different from that of said adjacent secondary portions.

The objects assigned to the invention are also achieved by means of a method for manufacturing a deformable mirror, characterized in that it includes:

on the one hand, at least one step of making a plate having a reflective face and an opposite hidden face and whose shape has a center and radiuses, said plate comprising a plurality of primary and secondary portions, said secondary portions being interposed between said primary portions, each of said primary portions extending locally substantially along and on either side of a respective radius among said radiuses and having a stiffness different from that of said adjacent secondary portions, and on the other hand, at least one step of setting in place at least one actuator intended to exert a force on said hidden face in order to deform said plate.

Other particularities and advantages of the invention will appear and come out in more details upon reading the description made hereinafter, with reference to the appended drawings, given only as an illustrative and non-limiting example, in which.

According to a first aspect, illustrated in FIGS. 1 to 5, the invention concerns a deformable mirror 1.

In particular, the mirror 1 is intended to be used in a system requiring the use of adaptive optics, for example an astronomical observation system or an ophthalmological imaging system. In particular, the mirror 1 is intended to introduce or correct an optical aberration in a light beam.

Figure 1:
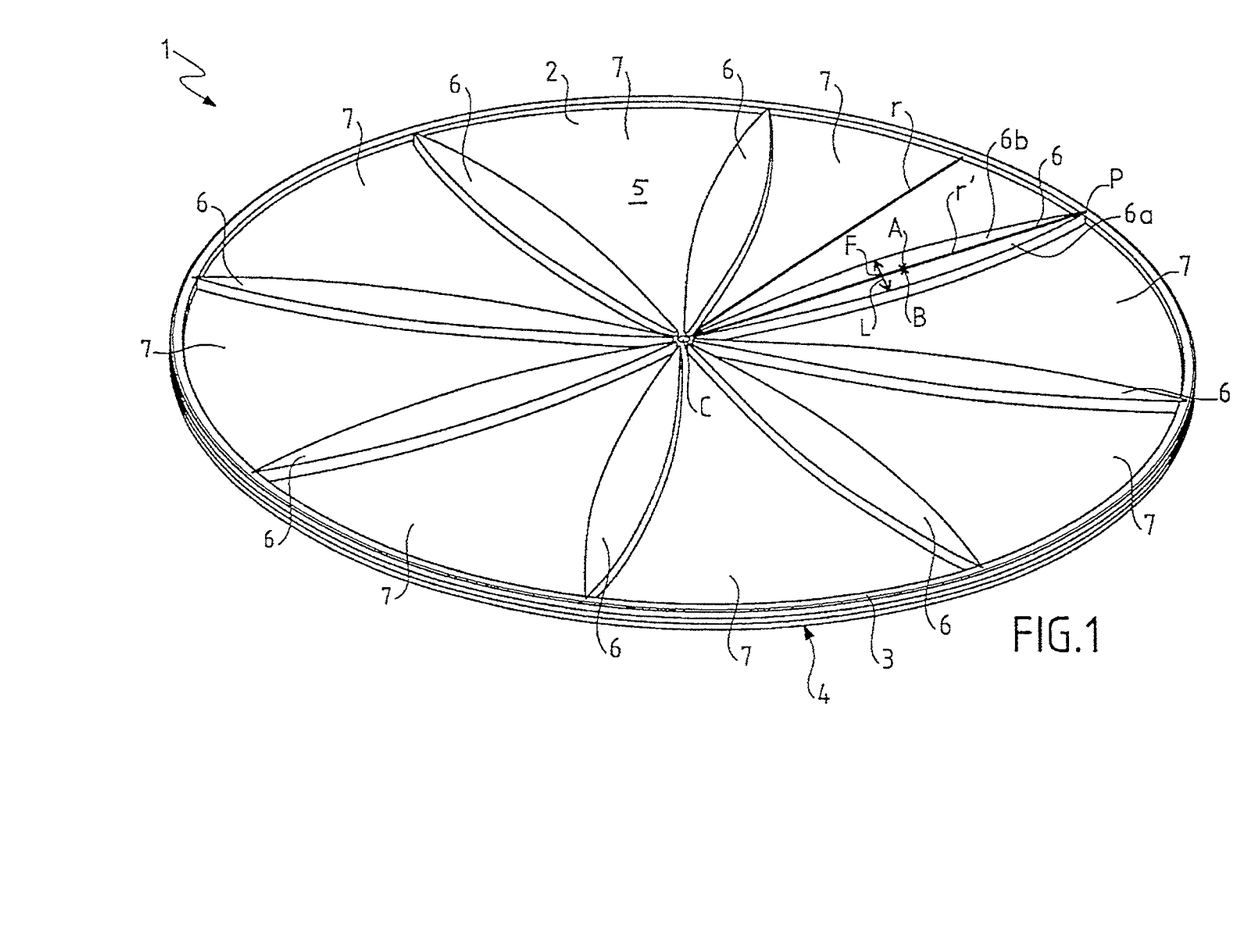
FIG. 1 illustrates, according to a perspective view, a deformable mirror according to a first embodiment of the invention, said mirror being viewed from its hidden face side.

According to the present invention, and as represented in FIG. 1, the mirror 1 includes a plate 2 having a reflective face 4 and an opposite hidden face 5. Preferably, said reflective face 4 is locally parallel to said hidden face 5, said reflective 4 and hidden 5 faces lying on faces of said plate 2 opposite to each other.

Advantageously, in the absence of any external influence, said plate 2 has a substantially planar general shape, or slightly cambered, that is to say convex (or slightly concave, depending on the point of view), and preferably includes at least one finished edge 3. Said convexity (or concavity, depending on the point of view) of said plate 2 is preferably slight enough, that is to say having a relatively considerable radius of curvature in comparison with the dimensions of said plate 2, such that the surface of said cambered plate 2 may be assimilated, locally (that is to say over a fraction of the surface area of said plate 2), to a planar surface.

Preferably, in the absence and/or in the presence of an external influence, said plate 2 has a substantially planar or slightly cambered general shape, possibly with a convexity or concavity slight enough to be invisible or barely noticeable to the naked eye, said convexity or concavity of the plate 2 being for example too reduced for the plate 2 to form a significant portion of a sphere, such as for example a half, a third, a quarter or a fifth or more of a sphere. In any case, preferably, the convexity or concavity of the plate 2 would not delimit a significant internal space.

Preferably, said plate 2 is manufactured from a relatively flexible material, but still having some mechanical strength, such that it is barely deformed, or not at all, as long as it is not subjected to a sufficient external pressure or tension. Hence, said plate 2 advantageously presents an intrinsic mechanical strength, is not flabby, and still presents enough flexibility to undergo a slight elastic deformation, that is to say reversible, in particular when it is biased in flexion.

Advantageously, said plate is a thin, deformable plate, which is deformed in particular by the action of an external force exerted at its surface, in particular a force exerted by an actuator.

Advantageously, the plate 2 has an average thickness smaller than or equal to 50 µm, preferably smaller than or equal to 10 µm, and even substantially comprised between 3 µm and 5 µm. Preferably, with regards to the function intended by the invention, the plate 2 has a relatively small size, and has for example a diameter smaller than or equal to 30 mm, preferably smaller than or equal to 20 mm, still more preferably smaller than or equal to 15 mm.

Preferably, said plate 2 is essentially made of silicon, of metal (for example of steel or aluminum), of an alloy, of polymer(s), of composite material(s), of ceramic(s), or by an assembly of several different materials, in particular among the aforementioned materials.

Advantageously, when subjected to an external pressure or tension, for example a central pressure or tension, said plate 2 is deformed so as to generate, when said plate 2 is made substantially planar, a convexity (or concavity, depending on the point of view), or still, when said plate is made substantially cambered or convex, so as to accentuate a convexity (or concavity, depending on the point of view), or still reduce a convexity (or concavity, depending on the point of view). For example, when said plate 2 is made substantially cambered or convex (or concave, depending on the point of view), a sufficient external pressure or tension applied at the appropriate location(s) of said plate 2, may make said plate 2 substantially planar, as long as said pressure or tension is exerted.

According to the present invention, and as represented in the figures, the shape of said plate 2 has a center C and radiuses r.

Preferably, said center C is a geometric center of said shape of said plate 2, for example a center of gravity and/or a barycenter.

Preferably, each of said radiuses r is a segment whose first end is coincident with said center C, and whose second end is a peripheral end point P, that is to say a point of an edge 3 of said plate 2.

Advantageously, and as illustrated in the figures, said shape of said plate 2 is substantially circular or elliptical. In the case of a circular shaped plate 2, all of said segments have substantially the same length, said plate 2 being in the form of a disc, and the edge 3 of said plate 2 describing a circle.

Alternatively, said shape of said plate 2 is triangular, rectangular, square, trapezoidal, or any other appropriate polygonal geometry.

Preferably, when said plate 2 is slightly cambered (concave or convex depending on the point of view), said shape of said plate 2 is assimilated to the aforementioned characteristics when said cambered plate 2 is laid flat.

Preferably, said reflective face 4 has a substantially smooth surface, intended to reflect a light beam, and to introduce an optical aberration or correct it when said mirror 1 is actively deformed. Thus, said reflective surface 4 advantageously consists of a joint surface, devoid of any unevenness or asperity, and is preferably intended to receive an incident light beam and reflect it in the form of a reflected light beam presenting either an optical aberration inexistent in the incident beam, or a correction of an optical aberration present in the incident beam, or both.

Said hidden face 5 is preferably intended to undergo pressures or tensions allowing deforming said plate 2 in an appropriate manner, that is to say in a satisfactory manner such that the mirror 1 fulfills its function in an adaptive optics system.

Thus, said plate 2 advantageously presents a flat or slightly cambered shape, having two reflective 4 and hidden 5 faces which are opposite to each other and which are separated by the thickness of said plate 2, said thickness being preferably relatively small in comparison with the dimension of extension of said faces 4, 5 of said plate 2.

Said reflective 4 and hidden 5 faces of said plate 2 are preferably made integrally with said plate 2, for example machined in the same material.

Alternatively, said plate 2 is constituted by several plate portions attached and bonded to each other, one of the plate 2 portions comprising for example the reflective face 4, and another one of the plate 2 portions comprising for example the hidden face 5.

According to the present invention, the deformable mirror 1 also includes at least one actuator (not represented) intended to exert a force on said hidden face 5 in order to deform said plate 2. In other words, said deformable mirror 1 comprises at least one actuator, designed to exert a pressure or a tension on said plate 2 at said hidden face 5 side, so as to effectively deform said plate 2 in order to introduce or correct an optical aberration of a light beam reflected by said reflective face 4, more specifically by locally deforming the curvature of said plate 2 (and therefore more generally the curvature of the mirror or more exactly the curvature of its reflective face 4). This results in that said curvature varies, at least locally, according to the force exerted by said actuator on said hidden face 5.

Advantageously, said actuator is designed to apply said force at said center C.

Preferably, said force is exerted according to a direction locally substantially perpendicular to said reflective surface 4.

Preferably, the deformable mirror 1 further comprises a fixed support on which said plate 2 bears peripherally, said fixed support being preferably linked to a frame. Nonetheless, even though it rests on said support, the plate 2 is advantageously sufficiently rigid and solid such that there is no need to adjoin a holding structure, for example a framework, thereto in order to guarantee its intrinsic mechanical strength. In other words, the plate 2 ensures, preferably by its own construction, its intrinsic mechanical strength, without requiring any framework, hatch, skeleton or any other stiffening structure.

Alternatively, said deformable mirror 1 comprises peripheral actuators (alone or in combination with said fixed support) on which said plate 2 bears peripherally.

Advantageously, said actuator(s) may be of any type (piezoelectric actuator, magnetic actuator, two-part actuator, mechanical actuator, screw actuator, etc.), known to those skilled in the art. For example, said actuator is linked to said hidden face 5 via a bonding point, and transmits a tensile or pressure force locally at the surface of said hidden face 5 so as to deform said plate 2, said force preferably being locally substantially transverse to said reflective face 4.

Advantageously, said plate 2 includes at least one edge 3 which is either attached to said fixed support, or linked, in turn, to one or several actuator(s), or a combination of both (that is to say that some portions of said edge 3 are linked to actuators, whereas other portions of said edge 3 are linked to said fixed support).

FIGS. 1 to 5 illustrate the hidden face 5 of a deformable mirror 1 in the absence of said actuators and said frame.

Preferably, said mirror 1 comprises only one actuator or a limited number of actuators, for example one, two or three, to fill its adaptive optical function, that is to say to introduce or correct an optical aberration in a light beam.

For example, said hidden face 5 is intended to be subjected to the tension and/or the pressure of an actuator or set of actuators, preferably one single central actuator or a set of central actuators, that is to say one single actuator or a set of actuators exerting a force on said plate 2 in an area concentrated on and/or around said center C.

According to another example, said hidden face 5 is intended to be subjected to the pressure and/or the tension of a fluid pressure/depression type actuator, said pressure or depression being generated within said support so as to create, at the reflective face side, respectively a convexity or a concavity of said plate 2.

According to still another example, said hidden face is intended to be subjected to a plurality of actuators evenly distributed on the hidden face 5, that is to say regularly linked to said hidden face 5, the density of actuators/hidden face 5 linkages being almost equal over the entirety of said hidden face 5.

According to the present invention, said plate 2 comprises a plurality of primary 6 and secondary 7 portions, said secondary portions 7 being interposed between said primary portions 6. In other words, said plate 2 is divided into an alternation of primary 6 and secondary 7 portions. Advantageously, each of said primary portions 6 is bordered by at least two secondary portions 7, and conversely, each of said secondary portions 7 is bordered by at least two primary portions 6. Preferably, said primary 6 and secondary 7 portions occupy at least one portion of the surface area of said hidden face 5, and more preferably, they occupy the whole surface area of said hidden face 5. Thus, each of said primary 6 and secondary 7 portions advantageously presents a surface area smaller than the total surface area of said hidden face 5, and each of said plurality of primary portions 6 and said plurality of secondary portions 7 presents a surface area smaller than the total surface area of said hidden face 5.

Preferably, said plate 2 comprises as many primary portions 6 as secondary portions 7.

According to the present invention, and as illustrated in the figures, each of said primary portions 6 extends locally substantially along and on either side of a respective radius r' among said radiuses r. In other words, said primary portion 6 has a substantially elongate shape, which follows, at least over a significant portion, a respective radius r' among said radiuses r of said plate 2, said respective radius r' advantageously splitting said primary portion 6 into at least two portions 6a, 6b. In the following, for clarity, «said» primary portion 6, in the singular, will refer to the primary portion 6, among said primary portions 6, that is associated to said aforementioned respective radius r', each of said other primary portions 6 being associated to a different respective radius r' (that is to say a different respective radius r' for each primary portion 6, said respective radiuses r' having preferably the same length), and advantageously presenting the same characteristics described hereinafter as said primary portion 6. Thus, for example, the expressions «each of said primary portions 6» and «said primary portion 6» are equivalent. Preferably, all of said primary portions 6 are similar, except their spatial positioning.

Preferably, and as illustrated in the figures, said respective radius r' splits said primary portion 6 into two portions 6a, 6b, advantageously having substantially equal surface areas. Still more preferably, said portions 6a, 6b are substantially symmetrical, said respective radius r' forming their axis of symmetry.

Preferably, and as represented in the figures, said respective radius r' is completely inscribed within said primary portion 6. Alternatively, only one fraction of said respective radius r' is inscribed within said primary portion 6, said fraction of said respective radius r' being advantageously continuous, that is to say comprising only one section.

Figure 4:
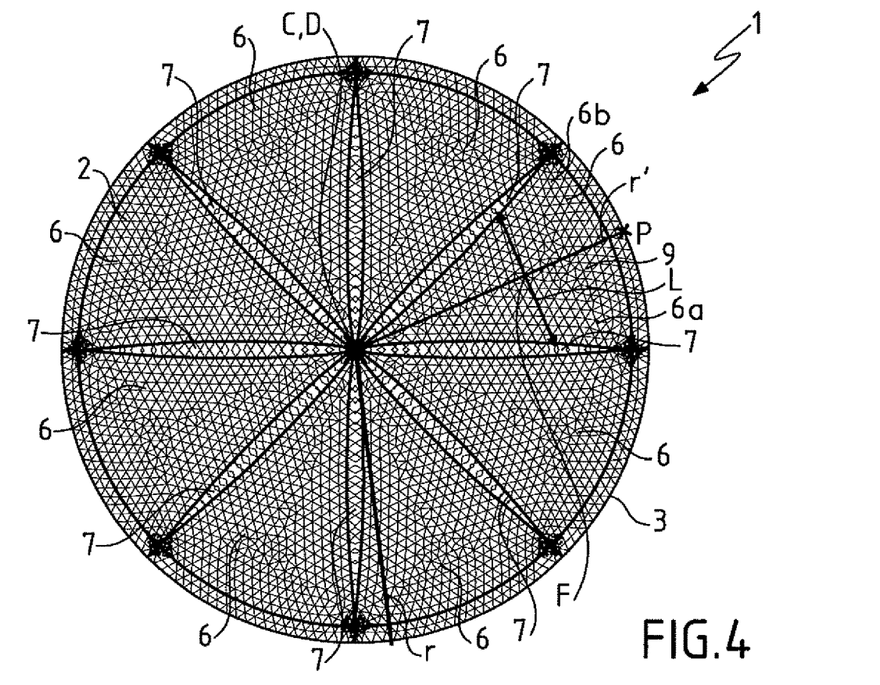
FIG. 4 illustrates, according to a front view, the hidden face of a deformable mirror according to a fourth embodiment of the invention.

Advantageously, and as illustrated in FIGS. 1 and 4, said primary portions 6 are evenly distributed angularly around said center C. In other words, each of said primary portions 6 preferably extend along a different respective radius r', the angle separating two adjacent respective radiuses r' being always substantially the same.

Advantageously, and as illustrated in FIGS. 1 and 4, said deformable mirror 1 comprises at least eight primary portions 6, preferably at least ten primary portions 6. For example, and as represented in FIGS. 1 and 4, said deformable mirror 1 comprises eight primary portions 6 and therefore eight respective radiuses r', each of said eight respective radiuses r' being separated from the adjacent respective radius r' by an angle of about 45 degrees.

According to the present invention, and as illustrated in the figures, each of said primary portions 6 has a stiffness different from that of said adjacent secondary portions 7. In other words, said primary portion 6 of said plate 2 is more difficult or easier to deform than the bordering secondary portions 7 and which are preferably at least in the number of two. This means that each primary portion 6 has an elastic deformation resistance different from that of the adjacent secondary portions 7. Still in other words, said primary portion 6 is a portion of said plate 2 which is more or less easier to deform, in particular by bending, by the action of said actuator(s), than another plate 2 portion comprising said secondary portions 7 adjacent to said primary portion 6. As a corollary, each secondary portion 7 advantageously has a stiffness different from that of said adjacent primary portions 6.

Advantageously, each of said secondary portions 7 adjacent to said primary portion 6 has the same stiffness.

Preferably, all of said primary portions 6 have the same primary stiffness, and all of said secondary portions 7 have the same secondary stiffness, said primary and secondary stiffnesses being substantially different from each other.

According to a variant of the invention, and as illustrated in FIG. 1, said primary portion 6 has a stiffness higher than that of said adjacent secondary portions 7.

According to another variant of the invention, and as represented in FIG. 4, said primary portion 6 has a stiffness lower than that of said adjacent secondary portions 7.

Preferably, and as represented in the figures, said primary portion 6 presents a thickened surface or a thinned surface with regards to said adjacent secondary portions 7.

Figure 2:
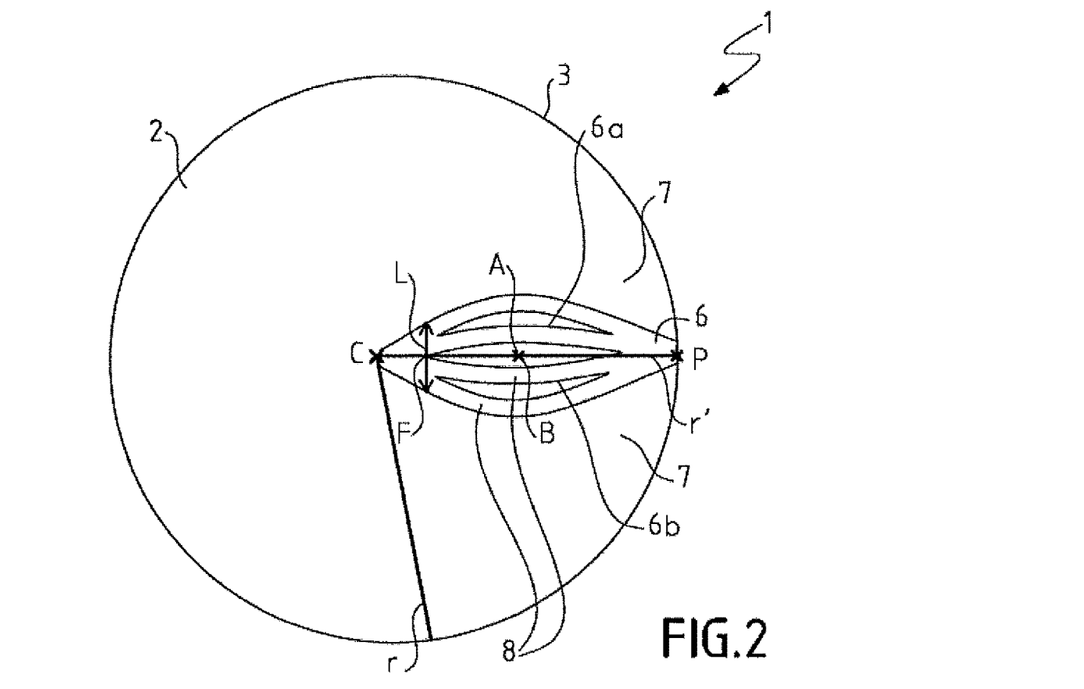
FIG. 2 illustrates, according to a front view, the hidden face of a deformable mirror according to a second embodiment of the invention, with only one primary portion represented.
Figure 3:
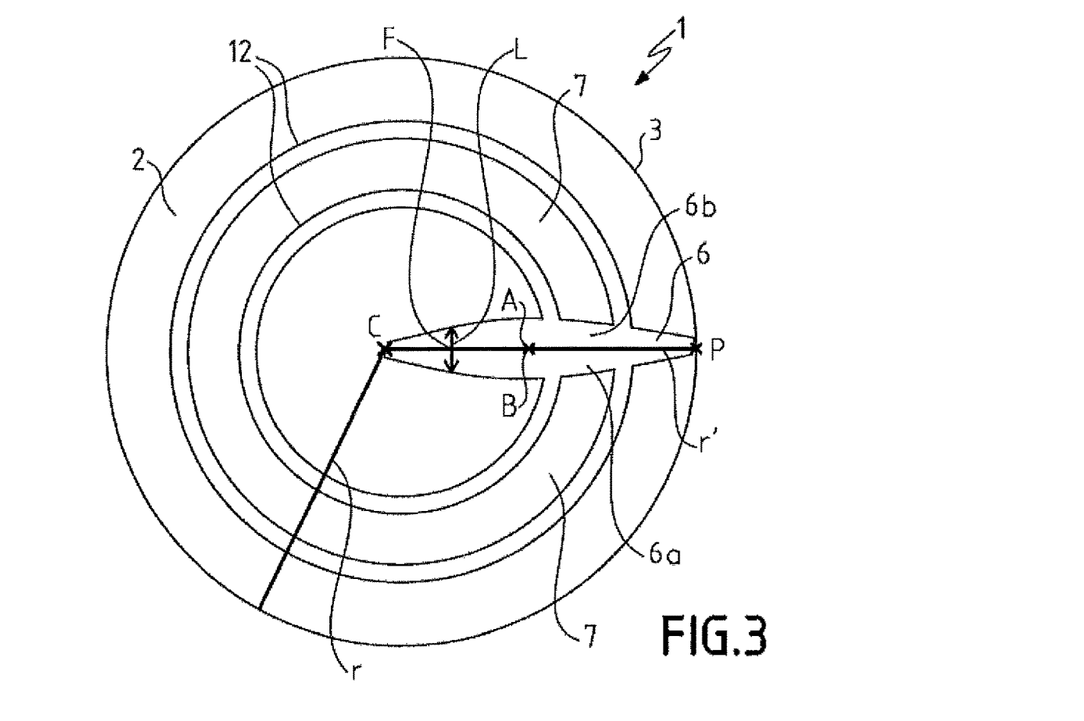
FIG. 3 illustrates the hidden face of a deformable mirror according to a third embodiment of the invention, with only one primary portion represented.
Figure 5:
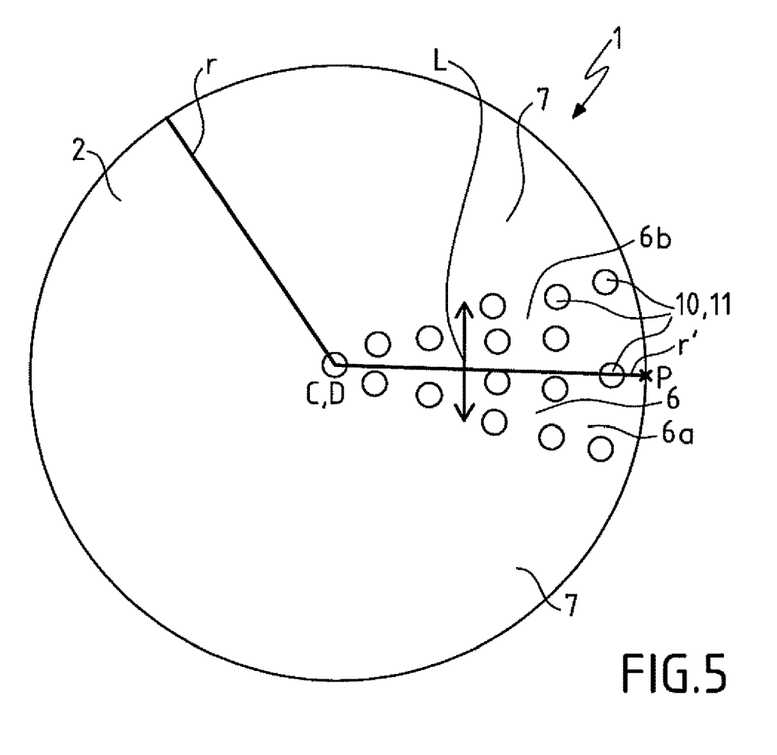
FIG. 5 illustrates, according to a front view, the hidden face of a deformable mirror according to a fifth embodiment of the invention, with only one primary portion represented.

Thus, FIG. 1 illustrates a deformable mirror 1 whose primary portion 6 presents a thickened surface, whereas FIG. 4 illustrates a deformable mirror 1 whose primary portion 6 presents a thinned surface. Each of FIGS. 2, 3 and 5 illustrates a deformable mirror 1 whose primary portion 6 may be either in relief, thereby presenting a thickened surface, or recessed, thereby presenting a thinned surface.

Preferably, said thickened surface or thinned surface of said primary portion 6 confers it with a stiffness respectively higher or lower than said secondary portions 7 adjacent to said primary portion 6. For example, FIG. 1 illustrates a mirror 1 wherein the higher stiffness of said primary portion 6 in comparison with that of said adjacent secondary portions 7 is obtained by means of the thickened surface of said primary portion 6 with regards to said adjacent secondary portions 7.

Preferably, a machining of said plate 2 is performed at said hidden face 5 side in order to form at least partially said thickened surface or said thinned surface. Thus, in particular in the case where said primary portion 6 is desired to present a thickened surface, it is proceeded for example to a machining of said secondary portions 7 adjacent to said primary portion 6. On the contrary, in the case where said primary portion 6 is desired to present a thinned surface, it is proceeded to a machining of said primary portion 6. Preferably, when the primary portion 6 is machined, it presents a stiffness lower than that of said secondary portions 7 adjacent to said primary portion, and conversely, when said secondary portions 7 adjacent to said primary portion 6 are machined, said primary portion 6 presents a stiffness higher than that of the secondary portions 7 adjacent to said primary portion 6.

Alternatively, said thickened surface is formed at least partially by a deformable slice attached, for example bonded, on said plate 2, thereby forming said primary portion 6. Preferably, said slice is made of the same material as that of the rest of the plate 2. Alternatively, said slice is made of a flexible material different from that of the rest of said plate 2. In general, said slice (and actually said thickened surface) is preferably intended to increase the stiffness of said primary portion 6. For example, said thickened surface is formed by a deformable slice attached on said plate 2, thereby forming said primary portion 6, and through a machining of the adjacent secondary portion 7.

Said thickened surface or said thinned surface may also be made through any appropriate method, for example through a selective etching, a selective deposition, etc., either of said primary portion 6, or of said adjacent secondary portions 7. Said thickened surface or said thinned surface may also be made through a combination of the aforementioned methods and means, for example by bonding a slice on the primary portion 6 followed by a machining of said secondary portions 7 adjacent to said primary portion 6.

Alternatively, and as illustrated in FIGS. 1 and 3, said primary portion 6 presents a continuous structure. In other words, said primary portion 6 is not formed by isolated sparse points, but rather preferably presents a substantially smooth and locally flat surface. Thus, an example of such a continuous structure is illustrated in FIGS. 1 and 3, where said primary portion 6 advantageously further presents a petal-like or spindle-like general shape, said petal being preferably made in one piece.

According to another alternative illustrated by the embodiments of the invention of FIGS. 2, 4 and 5, said primary portion 6 presents a discrete structure. In other words, said primary portion 6 presents a structure formed by sparse points, isolated from each other.

Examples of such a discrete structure are illustrated in FIGS. 4 and 5, where said primary portion 6 includes a set of cavities 9, 10 or protrusions 11 formed across its thickness, so as to confer said primary portion (6) with said stiffness different from that of said adjacent secondary portions (7).

In particular, FIG. 4 illustrates a mirror 1 whose primary portion 6 has a set of cavities 9 evenly distributed over the surface of said primary portion 6, said cavities 9 reducing the stiffness of said primary portion 6 in comparison with said adjacent secondary portions 7. Said cavities 9 of said primary portion 6 confers it with a discontinuous or discrete character, as well as a thinned surface with regards to said secondary portions 7 adjacent to said primary portion 6. In practice, the stiffness of said primary portion 6 of the mirror 1 illustrated in FIG. 4 is lower than that of said secondary portions 7 adjacent to said primary portion 6.

In particular, FIG. 5 illustrates a mirror 1 whose primary portion 6 has a set of cavities 10 or protrusions 11 (the black dots may represent the first ones or the second ones), irregularly distributed over the surface of said primary portion 6, said cavities 10 or protrusions 11 respectively reducing or increasing the stiffness of said primary portion 6 in comparison with said adjacent secondary portions 7. The advantageously irregular distribution of said cavities 10 or of said protrusions 11, which are for example distributed in a more dense manner close to said center C than an edge 3 of said plate 2, confers said primary portion 6 with a stiffness closer to that of said adjacent secondary portions 7 at the location where the cavities or protrusions 11 are distributed in a least dense manner (that is to say in this instance said center C), and conversely, said irregular distribution confers said primary portion 6 with a stiffness farther than that of said adjacent secondary portions 7 at the location where the cavities 10 or protrusions 11 are distributed in a most dense manner (that is to say in this instance an edge 3). Preferably, said cavities 10 or protrusions 11 are relatively small, that is to say with an individual surface area significantly smaller than the total surface area of said hidden face 5, preferably at least 10 times smaller, still more preferably at least 20 times smaller, still more preferably at least 50 times smaller.

Another example of such a discrete structure is illustrated in particular in FIG. 2, where said primary portion 6 also presents a petal-like or spindle-like general shape, said shape of said primary portion 6 being divided into several elongate and curved tabs 8, having a width (which remains constant or which varies) and a length, distinct and spaced apart from each other, except at their respective ends where they meet, said ends herein consisting on the one hand of said center C and on the other hand of a peripheral end point P of said plate 2. In practice, said tabs 8 preferably consist of thickened surfaces or thinned surfaces formed in said plate 2 at its hidden face side.

According to another embodiment, said primary portions 6 are formed by portions of said plate 2 which have undergone an alteration of the physical properties of the material(s) constituting said plate 2 thereby modifying the stiffness thereof.

According to still another embodiment (not illustrated in the figures), each primary portion 6 is formed from one or several material(s) whereas each secondary portion 7 is formed from one or several material(s), said first and second material(s) having different stiffnesses. Hence, in this case, the difference in stiffness is obtained through the implementation of different materials to form the primary 6 and secondary 7 portions, so that the plate 2 presents a composite character.

Preferably, and as illustrated in the figures, said primary portion 6 also has a dimension L which is locally substantially transverse to said respective radius r' and parallel to said reflective face 4 and which varies along said respective radius r'. In other words, said primary portion 6, which locally extends substantially along said radius r' and thus has a length smaller than or equal to said respective radius r', also has a width which is locally substantially perpendicular to said length, which extends over the plate 2, which is locally perpendicular to the local direction of extension of the thickness of said plate 2, and which varies. Herein, the terms «locally» and «local» may be used to consider the dimensions from a restrained or closer point of view, that is to say in order to approximate a locally substantially flat plate 2 when said deformable mirror 1 is slightly cambered (concave or convex). In practice, the primary portion 6 modifies significantly and in a differentiated manner the radial rigidity or stiffness of said plate 2, which is more difficult or easier to deform according to its respective radius r'; in other words, to deform a portion of said plate 2, using an actuator, by bringing a portion of said plate 2 comprising a segment of a respective radius r' close to or away from another portion of said plate 2 comprising the rest of the respective radius r'.

Alternatively, said transverse dimension L remains substantially constant all along said respective radius r'.

Preferably, and as illustrated in the figures, said transverse dimension L increases, starting from said center C, outwardly, along said respective radius r', up to a primary point A located on said respective radius r' and at a distance from said center C.

Alternatively, said transverse dimension L decreases, starting from said center C, outwardly, along said respective radius r', up to a tertiary point located on said respective radius r' and at a distance from said center C.

Preferably, the transverse dimension L, along the respective radius r', varies in a significant, controlled, continuous and regular manner.

Preferably, the transverse dimension L has a minimum value and a maximum value between which it varies. Advantageously, the difference between the minimum and maximum values is significant, controlled, that is to say determinate and not random, and amounts for example to at least 5%, preferably at least 10%, and even at least 30%, or still for example at least 50% of the length of the respective radius r'. Preferably, the transverse dimension L varies so that the associated primary portion 6 forms a significant and coherent set, that is to say having a size, a surface, a surface area which is determinate and non-negligible in comparison with the dimensions of the plate 2. Advantageously, said variation of said transverse dimension L does not result from an incident, an error, or an approximation in the construction of the deformable mirror 1, in particular of said plate 2, and more particularly of the primary portion 6 associated to said transverse dimension L.

Advantageously, the distance between said center C and said primary point A (or alternatively said tertiary point) represents, as illustrated in FIGS. 1 to 3, at least 30%, preferably at least 50%, or as represented in FIGS. 4 and 5, still more preferably at least 80%, or still more preferably the entirety of the length of said respective radius r'. Advantageously, this last example may be understood as an increase (or alternatively a decrease), preferably continuous, of said transverse dimension L from the center C up to an edge 3 of said plate 2 (or alternatively, an edge 3 or a peripheral end point of said respective radius r'), in particular in the case of a circular or elliptical shaped plate 2.

Alternatively, and in particular when said transverse dimension L only increases, continuously, from said center C, outwardly, all along said respective radius r', said primary portion 6 is formed by a respective circular sector of said plate 2.

Preferably, and as illustrated in FIGS. 1 to 3, said transverse dimension L increases, starting from a peripheral end point P of said respective radius r' and/or from an edge 3 of said plate 2 toward said center C (that is to say toward the interior of said plate 2), along said respective radius r', up to a secondary point B located on said respective radius r' and at a distance from said peripheral end point P and/or said edge 3.

Preferably, and as illustrated in FIGS. 1 to 3, the distance between said peripheral end point P and/or said edge 3 and said secondary point B represents at least 30%, more preferably at least 50% of the length of said respective radius r'.

Alternatively, said transverse dimension L decreases, starting from an edge 3 of said plate 2, toward said center C, along said respective radius r', up to a quaternary point D located on said respective radius r' and at a distance from said edge 3. According to a particular example, and as illustrated in FIGS. 4 and 5, the quaternary point D is coincident with said center C, said transverse dimension L decreasing from said edge 3 up to the center C along said respective radius r'; which is equivalent to the case where said transverse dimension L increases, starting from said center C, up to an edge 3 of said plate 2.

Preferably, said edge 3 is secant to said respective radius r'. Still more preferably, said edge 3 is split into two portions with the same lengths, and symmetrical, by said respective radius r'.

According to a variant of the invention, and as illustrated in FIGS. 1 to 3, said primary point A and said secondary point B are coincident.

According to another variant of the invention, not illustrated, said primary point A and said secondary point B are not coincident. Advantageously, said transverse dimension L, along said respective radius r', remains substantially constant between said primary A and secondary B points.

Thus, in the aforementioned last two variants, and, regardless of the direction, said transverse dimension L increases and then decreases along said respective radius r', starting from one end of said respective radius r' to the other (for example said center C and a peripheral end point P).

According to still another variant of the invention, not illustrated, said tertiary point and said quaternary point D are coincident.

According to still another variant of the invention, not illustrated, said tertiary point and said quaternary point D are not coincident.

For this last variant, for example, said transverse dimension L, along said respective radius r', remains substantially constant between said tertiary and quaternary D points.

Thus, in the aforementioned last two variants, said transverse dimension L decreases and then increases along said respective radius r', starting from one end of said respective radius r' to the other (for example said center C and a peripheral end point P), and this, regardless of the direction.

Preferably, said transverse dimension L, considered at a point F of said respective radius r', satisfies the equation: $L=L_0*N^2*\ln(N^2)$, where N is the ratio between, on the one hand, the distance CF between said center C and said point F, and, on the other hand, the total length of said respective radius r', $L_0$ being a constant adjusted according to the number of primary portions 6 so that the latter do not overlap.

Of course, any combination of the aforementioned different variants and examples is possible, as it seems relevant to a person skilled in the art wishing to make an appropriate deformable mirror.

Preferably, and as illustrated in FIG. 3, the mirror 1 also comprises, at the side of the hidden face 5 of the plate 2, in particular when the latter is circular or elliptical shaped, one or several area(s) of said plate 2 which are in the form of a ring 12 and which have a stiffness different from that of said primary portions 6 and/or from that of said secondary portions 7, said ring(s) 12 having said center C as its/their center. Preferably, and as illustrated in FIG. 3, said ring(s) is/are formed in or attached on the thickness of the plate 2, and consist of thickened surfaces or thinned surfaces with regards to said primary 6 and/or secondary 7 portions. More preferably, said rings 12 are secant to said primary portion 6. In practice, they barely modify the radial rigidity or stiffness, but they allow reducing the errors in the shape of said primary portions 6 or the resonance modes between said primary portions 6.

Advantageously, each of said secondary portions 7 extends locally substantially along and on either side of a respective radius r' among said radiuses r. Thus, each of said primary 6 and/or secondary 7 portions preferably extends locally substantially along and on either side of a respective radius r' among said radiuses r. In particular, the secondary portion 7 has a (respective) dimension L which is locally substantially transverse to the respective radius r' and parallel to the reflective face 4 and which varies along the respective radius r'. In particular, the transverse dimension L of the secondary portion 7 may have dimensional properties similar to the transverse dimension of the primary portion 6. For example, each respective transverse dimension L increases, starting from the center C, outwardly, along the respective radius r', up to a respective primary point A located on the respective radius r' and at a distance from the center C. According to the embodiment of FIG. 1, given for illustration, starting from the center C, the respective transverse dimension L of the primary portion 6 increases and then decreases along the respective radius r', whereas the respective transverse dimension L of the secondary portion 7 only increases along the respective radius r.

Advantageously, the secondary portions 7 present shapes complementary with these of the primary portions 6. For example, as illustrated in FIG. 1, when each primary portion 6 presents a respective petal-like shape, and the plate 2 presents a substantially circular or elliptical general shape, each secondary portion 7 is, consequently, formed advantageously by the portion of the plate 2 separating two adjacent petals.

Preferably, said secondary portions 7 are evenly distributed angularly around the center C. Preferably, the deformable mirror 1 comprises at least eight secondary portions 7, and even at least ten secondary portions 7.

For example, the secondary portion 7 presents a continuous structure, as illustrated in FIG. 1. According to another example, the secondary portion 7 presents a discrete structure, as illustrated in FIG. 4. According to one embodiment, each primary 6 and/or secondary 7 portion is formed through a machining of said plate 2 performed at said hidden face 5 side. According to one embodiment, the secondary portion 7 includes a set of cavities or protrusions formed across its thickness, so as to confer the secondary portion 7 with a stiffness different from that of the adjacent primary portions 6. According to a particular embodiment, the secondary portions 7 are formed by respective portions of said plate 2 which have undergone an alteration of the physical properties of the material(s) constituting said plate 2 thereby modifying the stiffness thereof. According to an example, each secondary portion 7 is formed by a respective circular sector of said plate 2. According to still another example, each secondary portion 7 presents a petal-like or spindle-like general shape, as illustrated in FIG. 4.

According to another aspect, the invention concerns a method for manufacturing a deformable mirror 1. Preferably, said method is implemented to manufacture the above-described deformable mirror 1, but may also be implemented to make other mirrors, yet without departing from the scope of the invention. Hence, the previous description regarding the deformable mirror 1 is applicable, mutatis mutandis, for the method according to the invention.

According to the invention, said method includes:
on the one hand, at least one step of making a plate 2 having a reflective face 4 and an opposite hidden face 5 and whose shape has a center C and radiuses r, said plate 2 comprising a plurality of primary 6 and secondary 7 portions, said secondary portions 7 being interposed between said primary portions 6, each of said primary portions 6 extending locally substantially along and on either side of a respective radius r' among said radiuses r and having a stiffness different from that of said adjacent secondary portions 7, and
on the other hand, at least one step of setting in place at least one actuator intended to exert a force on said hidden face 5 in order to deform said plate 2.

Preferably, during said step of making said plate 2, said primary portions 6 are made such that each of them has a dimension L which is locally substantially transverse to said respective radius r' and parallel to said reflective face 4, and which varies along said respective radius r'.

Alternatively, said primary portion 6 is made such that said transverse dimension L remains constant all along said respective radius r'.

Advantageously, during said step of making said plate 2, each of said primary portions 6 is made so that it extends locally substantially along and on either side of a respective radius r' among said radiuses r. Still more advantageously, during said step of making said plate 2, said secondary portions 7 are made so that each of them has a respective dimension L which is locally substantially transverse to said respective radius r' and parallel to said reflective face 4, and which varies along said respective radius r'.

What is claimed is:

1. A deformable mirror (1) for use in an adaptive optics system for introducing or correcting an optical aberration in a light beam, comprising a plate (2) having a reflective face (4) and an opposite hidden face (5) and whose shape has a center (C) and radiuses (r), wherein said plate (2) comprises a plurality of primary (6) and secondary (7) portions, said secondary portions (7) being interposed between said primary portions (6), each of said primary portions (6) extending locally substantially along and on either side of a respective radius (r') among said radiuses (r) and having a stiffness different from that of said adjacent secondary portions (7),
wherein said hidden face (5) is adapted to receive a force exerted by at least one actuator in order to deform said plate (2),
wherein the reflective face (4) has a smooth surface comprising a joint surface, said reflective face (4) lacking unevenness and asperity, and said plate (2) having an intrinsic mechanical strength,
whereby the hidden face (5) is adapted for undergoing pressure or tension to allow for deformation of the plate (2).

2. The deformable mirror (1) according to claim 1, characterized in that said shape of said plate (2) is substantially circular or elliptical.

3. The deformable mirror (1) according to claim 2, characterized in that said primary portion (6) is formed by a respective circular sector of said plate (2).

4. The deformable mirror (1) according to claim 1, characterized in that said primary portion (6) has a dimension (L) which is locally substantially transverse to said respective radius (r') and parallel to said reflective face (4) and which varies along said respective radius (r').

5. The deformable mirror (1) according to claim 4, characterized in that said transverse dimension (L) increases, starting from said center (C), outwardly, along said respective radius (r'), up to a primary point (A) located on said respective radius (r') and at a distance from said center (C).

6. The deformable mirror (1) according to claim 5, characterized in that the distance between said center (C) and said primary point (A) represents at least 30%, preferably at least 50%, still more preferably at least 80%, or still more preferably the entirety of the length of said respective radius (r').

7. The deformable mirror (1) according to claim 5, characterized in that said transverse dimension (L) increases, starting from a peripheral end point (P) of said respective radius (r') and/or from an edge (3) of said plate (2) toward said center (C), along said respective radius (r'), up to a secondary point (B) located on said respective radius (r') and at a distance from said peripheral end point (P) and/or from said edge (3).

8. The deformable mirror (1) according to claim 7, characterized in that the distance between said peripheral end point (P) and/or said edge (3) and said secondary point (B) represents at least 30%, more preferably at least 50% of the length of said respective radius (r').

9. The deformable mirror (1) according to claim 7, characterized in that said primary point (A) and said secondary point (B) are coincident.

10. The deformable mirror (1) according to claim 7, characterized in that said transverse dimension (L), along said respective radius (r'), remains substantially constant between said primary (A) and secondary (B) points.

11. The deformable mirror (1) according to claim 4, characterized in that said transverse dimension (L) increases and then decreases along said respective radius (r').

12. The deformable mirror (1) according to claim 4, characterized in that said transverse dimension (L), considered at a point (F) of said respective radius (r'), satisfies the equation: $L=L_0*N^2*\ln(N^2)$, where N is the ratio between, on the one hand, the distance (CF) between said center (C) and said point (F), and, on the other hand, the total length of said respective radius (r'), $L_0$ being a constant adjusted according to the number of primary portions (6) so that the latter do not overlap.

13. The deformable mirror (1) according to claim 1, characterized in that said primary portion (6) presents a petal-like general shape.

14. The deformable mirror (1) according to claim 1, characterized in that said primary portion (6) has a stiffness higher than that of said adjacent secondary portions (7).

15. The deformable mirror (1) according to claim 1, characterized in that said primary portion (6) has a stiffness lower than that of said adjacent secondary portions (7).

16. The deformable mirror (1) according to claim 1, characterized in that each of said secondary portions (7) adjacent to said primary portion (6) has the same stiffness.

17. The deformable mirror (1) according to claim 1, characterized in that said primary portions (6) are evenly distributed angularly around said center (C).

18. The deformable mirror (1) according to claim 1, characterized in that it comprises at least eight primary portions (6).

19. The deformable mirror (1) according to claim 18, wherein the deformable mirror (1) comprises at least ten primary portions (6).

20. The deformable mirror (1) according to claim 1, characterized in that said primary portion (6) presents a continuous structure.

21. The deformable mirror (1) according to claim 1, characterized in that said primary portion (6) presents a thickened surface or a thinned surface with regards to said adjacent secondary portions (7).

22. The deformable mirror (1) according to claim 21, characterized in that said thickened surface is formed at least partially by a deformable slice attached, for example bonded, on said plate (2), thereby forming said primary portion (6).

23. The deformable mirror (1) according to claim 21, characterized in that a machining of said plate (2) is performed at said hidden face (5) side in order to form at least partially said thickened surface or said thinned surface.

24. The deformable mirror (1) according to claim 1, characterized in that said primary portion (6) presents a discrete structure.

25. The deformable mirror (1) according to claim 1, characterized in that said primary portion (6) includes a set of cavities (9, 10) or protrusions (11) formed across its thickness, so as to confer said primary portion (6) with said stiffness different from that of said adjacent secondary portions (7).

26. The deformable mirror (1) according to claim 1, characterized in that said primary portions (6) are formed by portions of said plate (2) which have undergone an alteration of the physical properties of the material(s) constituting said plate (2) thereby modifying the stiffness thereof.

27. The deformable mirror (1) according to claim 1, characterized in that each primary portion (6) is formed from one or several first material(s) whereas each secondary portion (7) is formed from one or several second material(s), said first and second materials having different stiffnesses.

28. The deformable mirror (1) according to claim 1, characterized in that said actuator is designed to apply said force at said center (C).

29. The deformable mirror (1) according to claim 1, characterized in that said force is exerted according to a direction locally substantially perpendicular to said reflective surface (4).

30. A method for manufacturing a deformable mirror (1), for use in an adaptive optics system for introducing or correcting an optical aberration in a light beam comprising the step of:
    making a plate (2) having a reflective face (4) and an opposite hidden face (5) and whose shape has a center (C) and radiuses (r), said plate (2) comprising a plurality of primary (6) and secondary (7) portions, said secondary portions (7) being interposed between said primary portions (6), each of said primary portions (6) extending locally substantially along and on either side of a respective radius (r') among said radiuses (r) and having a stiffness different from that of said adjacent secondary portions (7), wherein the reflective face (4) has a smooth surface comprising a joint surface, said reflective face (4) lacking unevenness and asperity, said plate (2) having an intrinsic mechanical strength, and
    wherein said hidden face (5) is adapted to receive a force exerted by at least one actuator in order to deform said plate (2), the hidden face (5) being adapted for undergoing pressure or tension to allow for deformation of the plate (2).

31. The method for manufacturing a deformable mirror (1) according to claim 30, wherein, during said step of making said plate (2), said primary portions (6) are made such that each of them has a dimension (L) which is locally substantially transverse to said respective radius (r') and parallel to said reflective face (4), and which varies along said respective radius (r').

* * * * *